W. A. KÖNEMAN.
VEHICLE TIRE.
APPLICATION FILED AUG. 26, 1907.
913,295.  Patented Feb. 23, 1909.
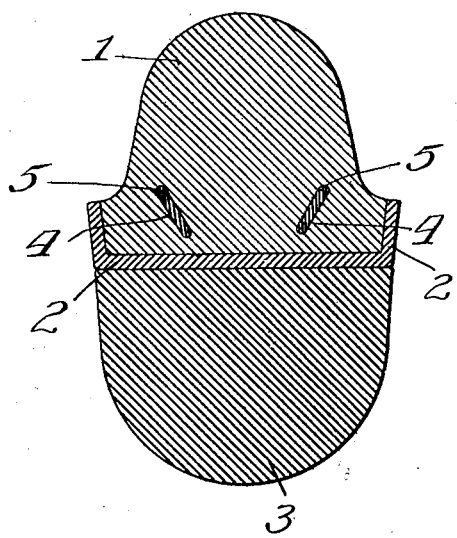
Witnesses:
Chas. E. Gaylord.
John Enders.
Inventor:
William A. Köneman,
By Dyrenforth, Lee, Chritton & Wiles,
Attys.

UNITED STATES PATENT OFFICE.

WILLIAM A. KÖNEMAN, OF MILWAUKEE, WISCONSIN.

VEHICLE-TIRE.

No. 913,295.  Specification of Letters Patent.  Patented Feb. 23, 1909.

Application filed August 26, 1907. Serial No. 390,115.

*To all whom it may concern:*

Be it known that I, WILLIAM A. KÖNEMAN, a citizen of the United States, residing at Milwaukee, in the county of Milwaukee and State of Wisconsin, have invented a new and useful Improvement in Vehicle - Tires, of which the following is a specification.

My invention relates to an improvement in the class of solid tires, usually formed of rubber with parallel cylindrical wires extending longitudinally through the tire-body near its base to afford means for fastening it in place about a wheel-rim by welding, brazing or otherwise securing the ends of each wire together.

The object of my invention is to dispense with the fastening-wires, because of their tendency to cut through the base and of the comparatively small surface their ends present for uniting them, and provide in their stead fastening-means that will avoid the objections referred to and afford the further advantage of exerting upon the tire under the stresses to which it is subjected in use, lateral compression tending to increase the hold upon it of the rim about which it is confined.

The accompanying drawing illustrates my invention by a cross-sectional view through the tire, its supporting rim and the felly of a wheel.

The tire 1 is represented as of the usual shape of solid rubber tires in the class to which my invention relates, as is also the rim 2 on the felly 3. In molding the tire two elongated openings 4, 4 are formed through it in its base or seating portion, at opposite sides of its longitudinal center, toward which they incline convergingly, each opening being shown to be provided about midway between a side of the tire-base and its longitudinal center, though it may be closer to the center than represented. Through each opening 4 is inserted, in the usual way of inserting the wires referred to, a flat or approximately flat strip 5 of steel preferably having its lateral edges rounded, as represented, to prevent tendency in them to cut the rubber. By thus providing the binding-strips 5, they incline inwardly toward the canvas-covered bottom of the tire, and are readily bent to the circular shape to which the tire is reduced in applying it on the rim, in which position the ends of each strip may be welded or brazed, as usual, the flat shape of the strip presenting the advantage of a relatively extensive surface for such modes of fastening. Moreover, and as the primary advantage of my improvement, the convergingly inclining wide metal strips tend to crowd the base-portion of the tire against the lateral flanges and base of the rim 2, under the stresses to which the tire is subjected in use, with the effect of tightening the tire in place against torsional strains tending to twist it out of its seat. Thus, the pressure on the tread of the tire, in running straightway on the road, is transmitted by compression against the inner flat surfaces of the inclined metal strips and by them exerted outwardly, in directions at, or approximately at, right-angles to them, against the stock of the tire-base which the compression forces against the rim to tighten the tire in its seat. Under torsional strain, the binding of the tire in place by the compression referred to is exerted even more forcibly, since, supposing the strain exerted to be such as to tend to raise either side of the tire-base, and thus roll the tire, out of its seat in the flanged rim, the compression of the tire-stock in directions at right-angles to the strips, as described, forces it outwardly and downwardly against the rim, thereby tightening it in place, and this without cutting the stock because of the expanse of surface presented to it by the strips 5.

What I claim as new, and desire to secure by Letters Patent, is—

1. A solid tire of the character described, provided with fastening means consisting of flat - metal bands extending longitudinally through its base-portion and convergingly inclining at an angle to the edges thereof toward the center of the tire-base, for the purpose set forth.

2. A solid tire of the character described, provided with fastening-means consisting of flat-metal bands having rounded lateral edges, said bands extending longitudinally through the base-portion of the tire and convergingly inclining at an angle to the edges thereof toward the center of the tire-base, for the purpose set forth.

3. A solid tire of the character described, having slit-like openings formed parallel with each other lengthwise through its base-portion at opposite sides of the longitudinal center of the tire-base, to incline at an angle to the edges of said base-portion convergingly toward said center, with flat-metal binding-bands confined in said openings, for the purpose set forth.

WILLIAM A. KÖNEMAN.

In presence of—
R. A. SCHAEFER,
W. T. JONES.